April 7, 1959
W. A. BARDEN ET AL
2,881,280
ELECTRIC SNAP SWITCH
Filed Feb. 14, 1958
9 Sheets-Sheet 1
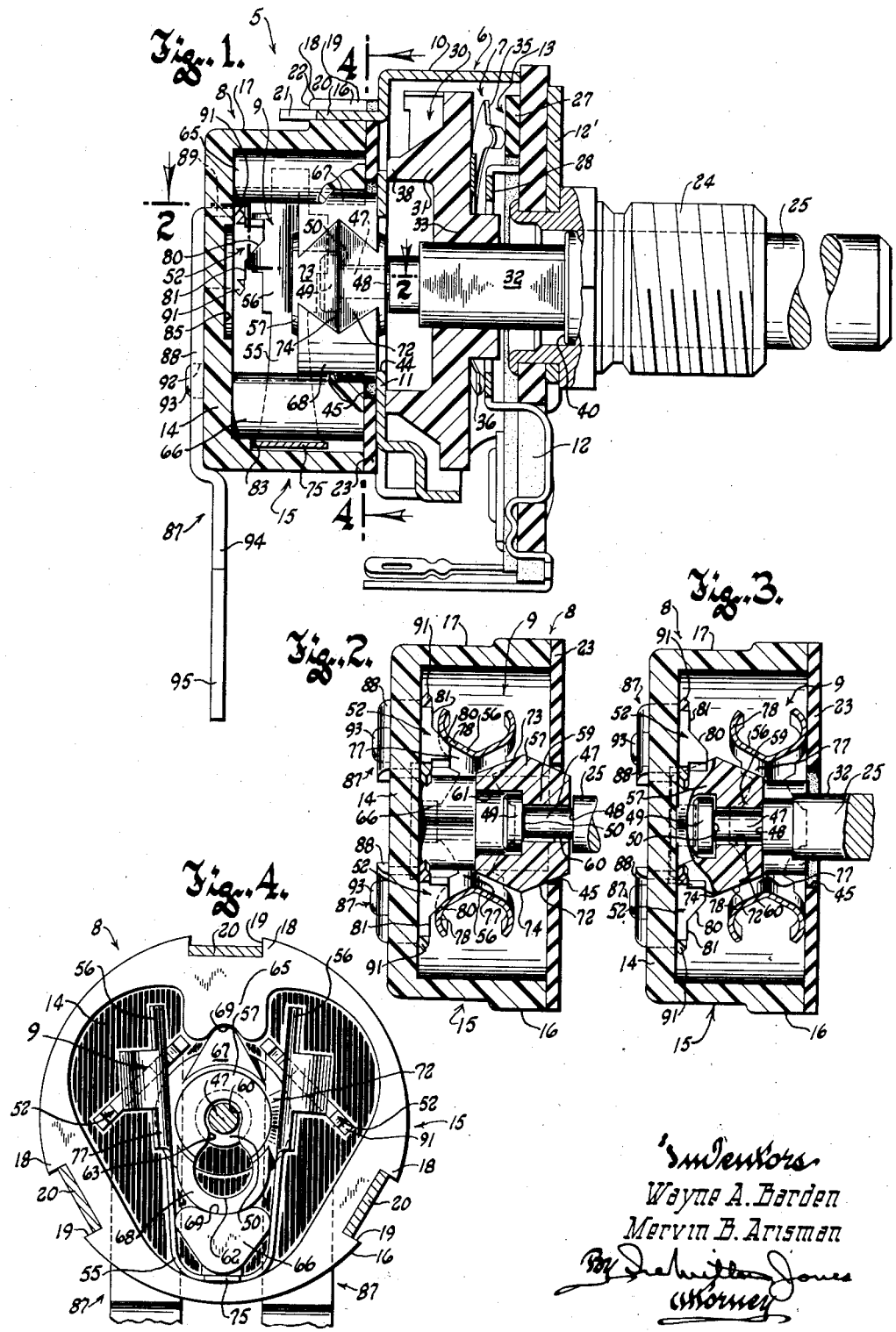
Inventors
Wayne A. Barden
Mervin B. Arisman

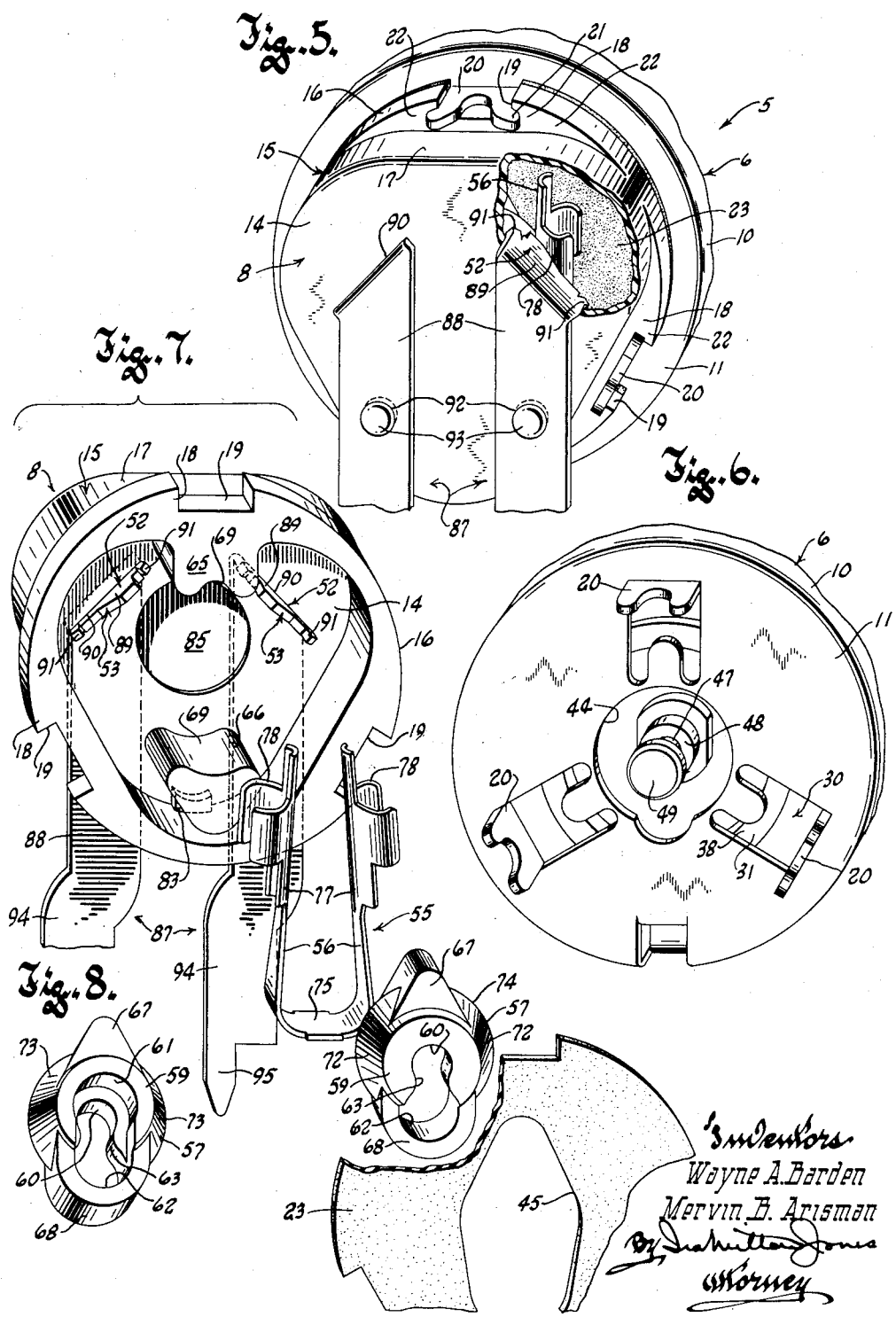

April 7, 1959  W. A. BARDEN ET AL  2,881,280
ELECTRIC SNAP SWITCH
Filed Feb. 14, 1958  9 Sheets-Sheet 3
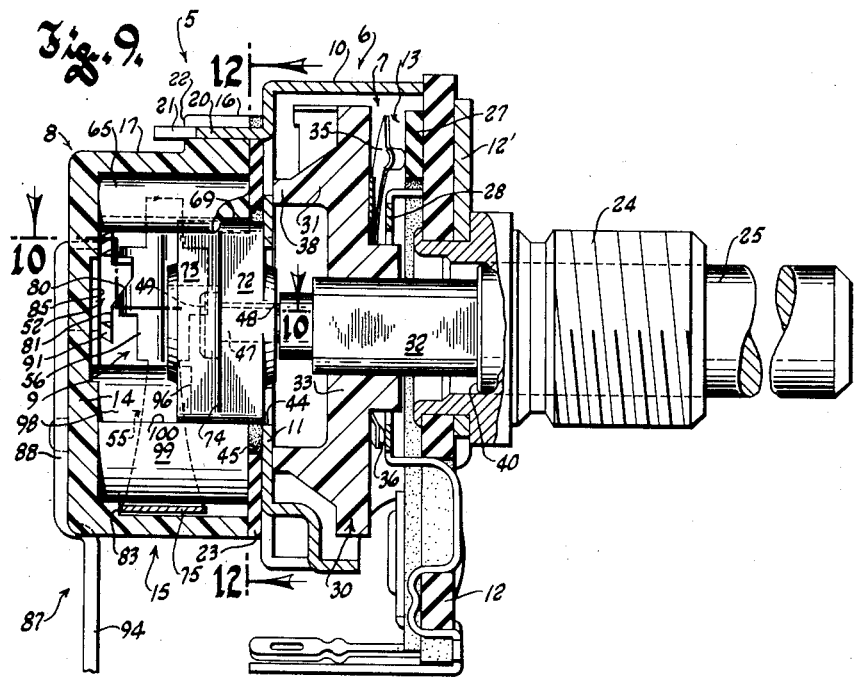
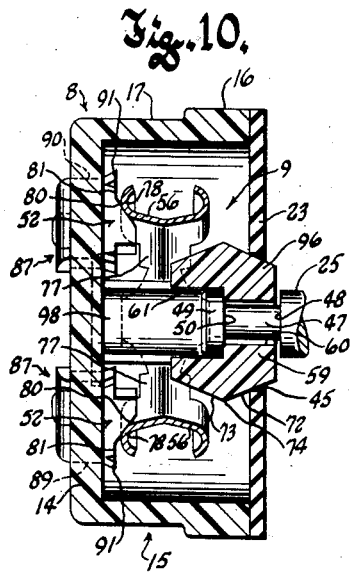 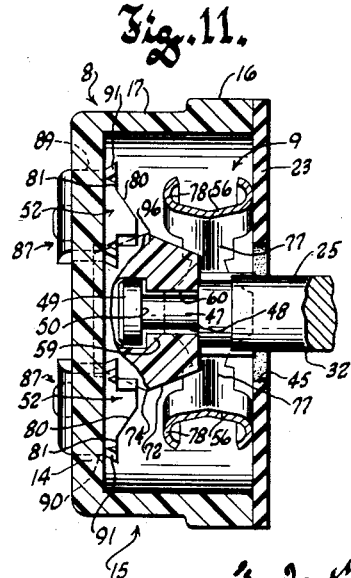
Inventors
Wayne A. Barden
Mervin B. Arisman

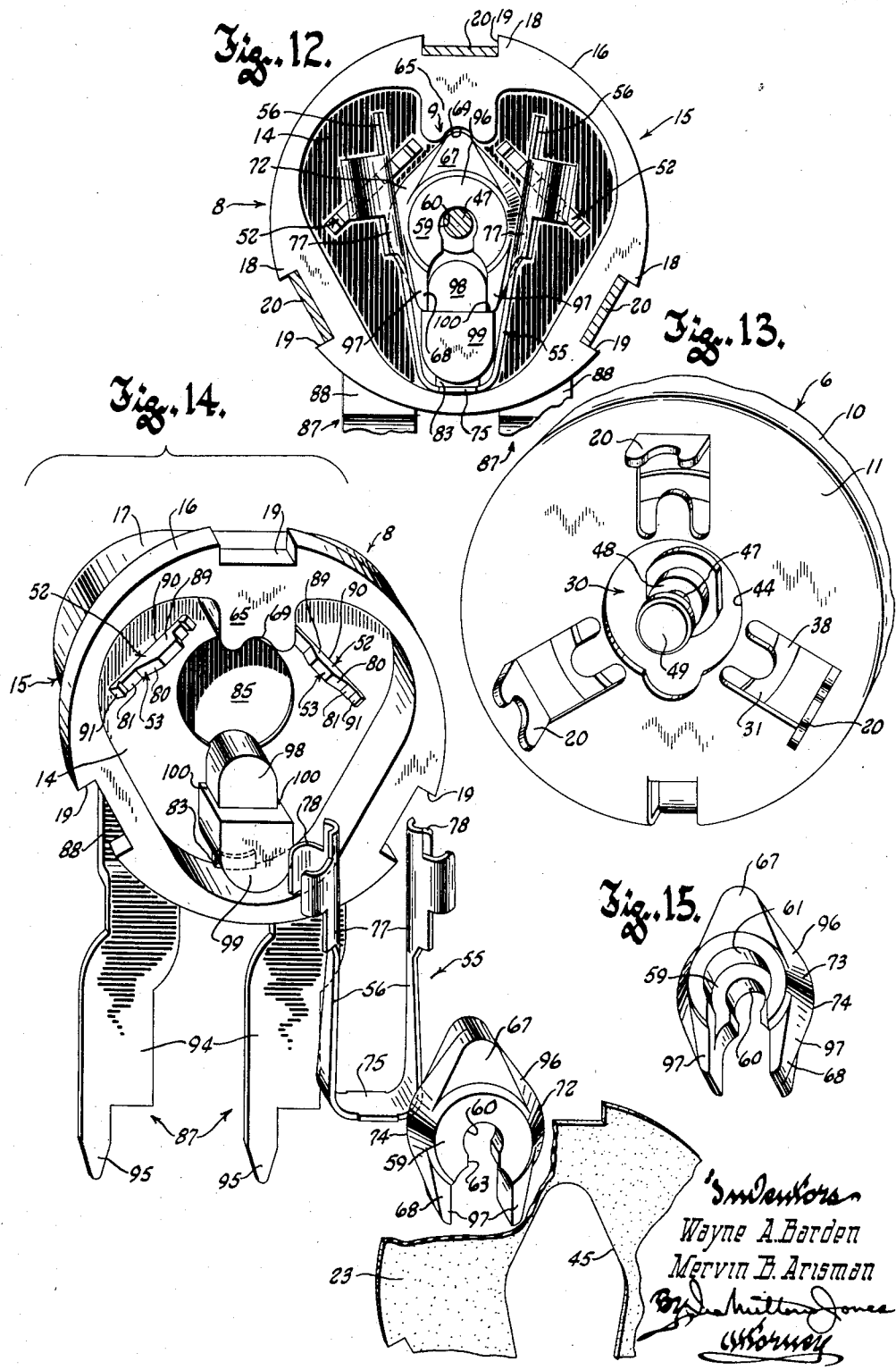

April 7, 1959 — W. A. BARDEN ET AL — 2,881,280
ELECTRIC SNAP SWITCH
Filed Feb. 14, 1958 — 9 Sheets-Sheet 5
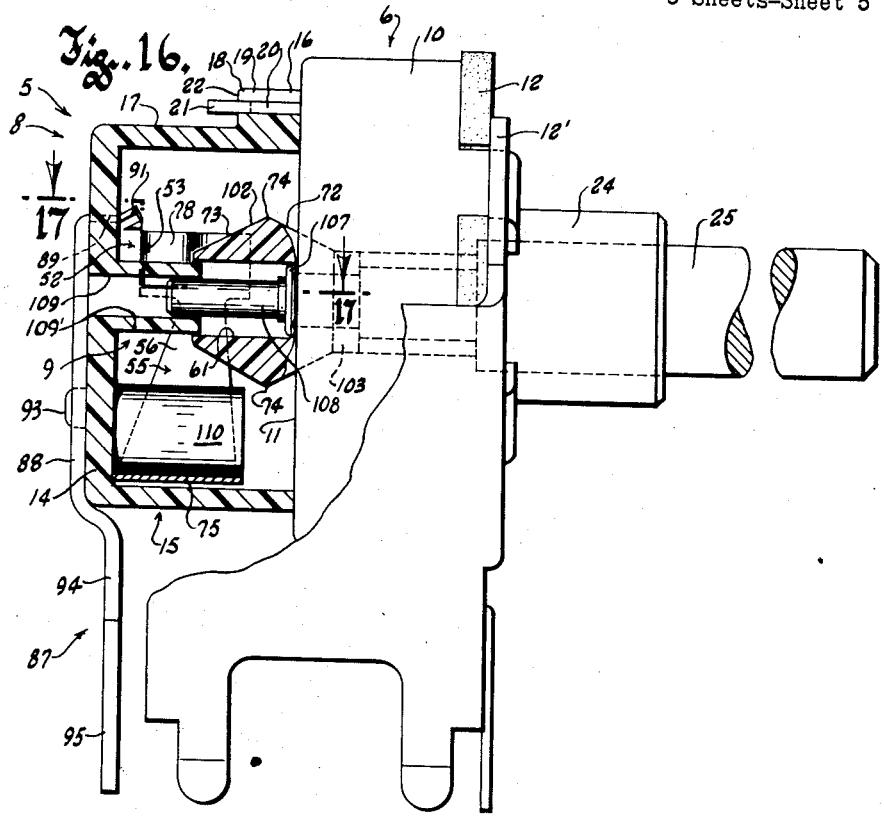
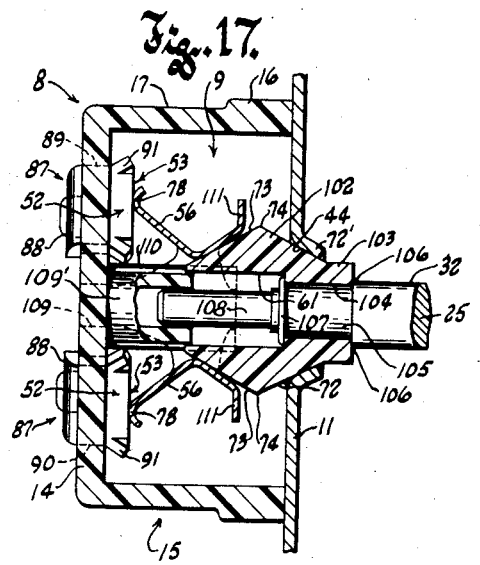
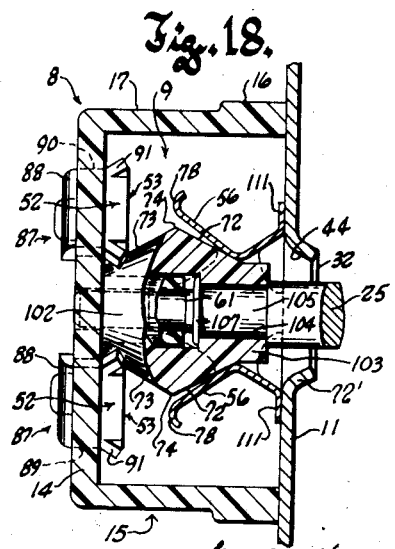
Inventors
Wayne A. Barden
Mervin B. Arisman April 7, 1959
W. A. BARDEN ET AL
2,881,280
ELECTRIC SNAP SWITCH
Filed Feb. 14, 1958
9 Sheets-Sheet 6
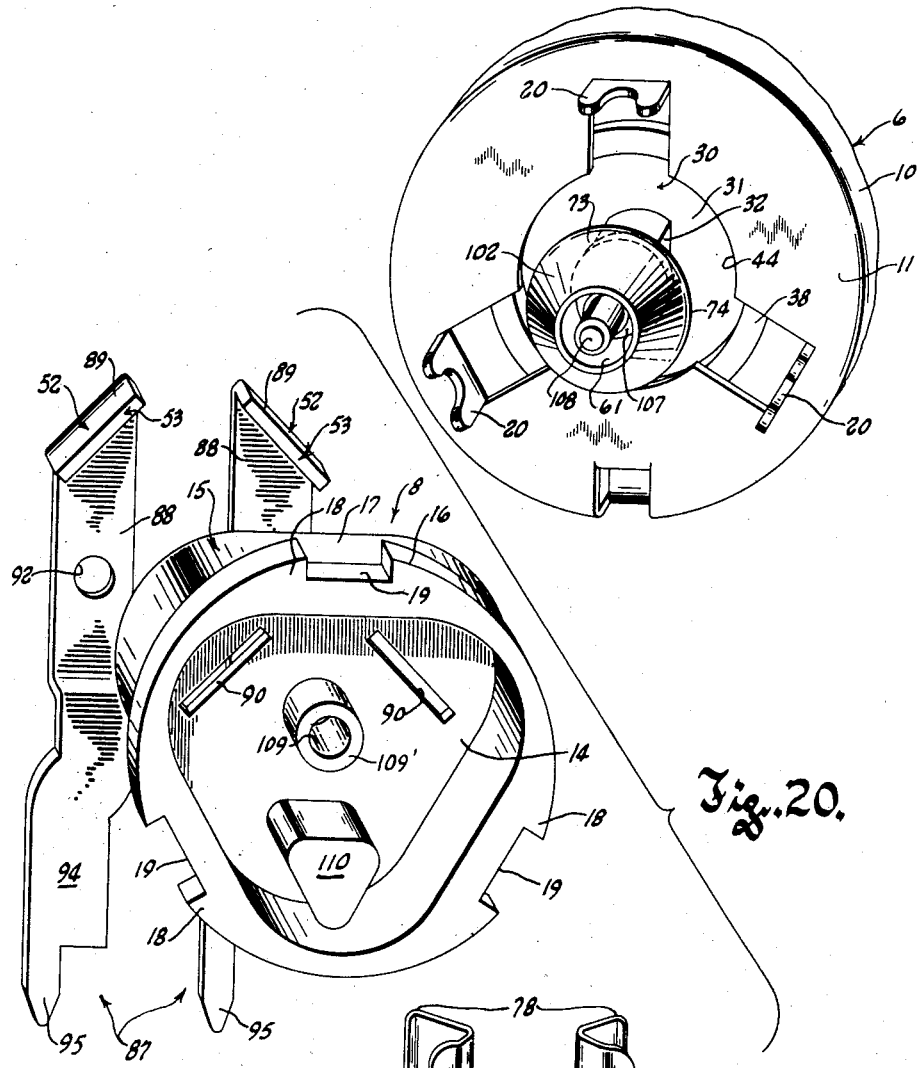
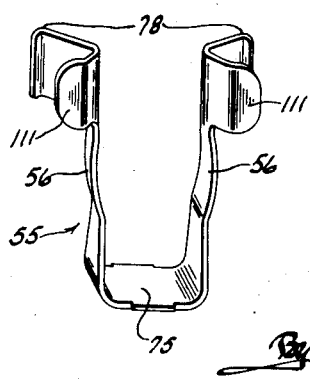
Inventors
Wayne A. Barden
Mervin B. Arisman April 7, 1959 W. A. BARDEN ET AL 2,881,280
ELECTRIC SNAP SWITCH
Filed Feb. 14, 1958
9 Sheets-Sheet 7

Inventors
Wayne A. Barden
Mervin B. Arisman

April 7, 1959
W. A. BARDEN ET AL
2,881,280
ELECTRIC SNAP SWITCH
Filed Feb. 14, 1958
9 Sheets-Sheet 8
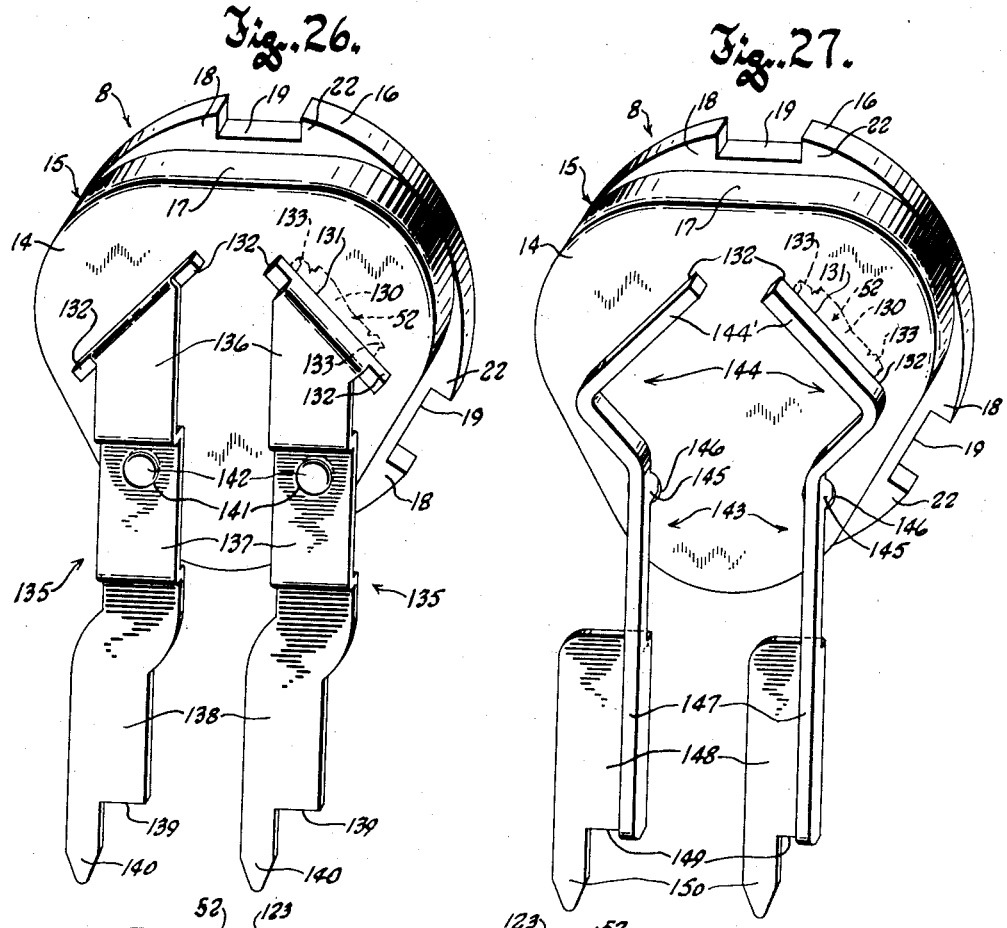
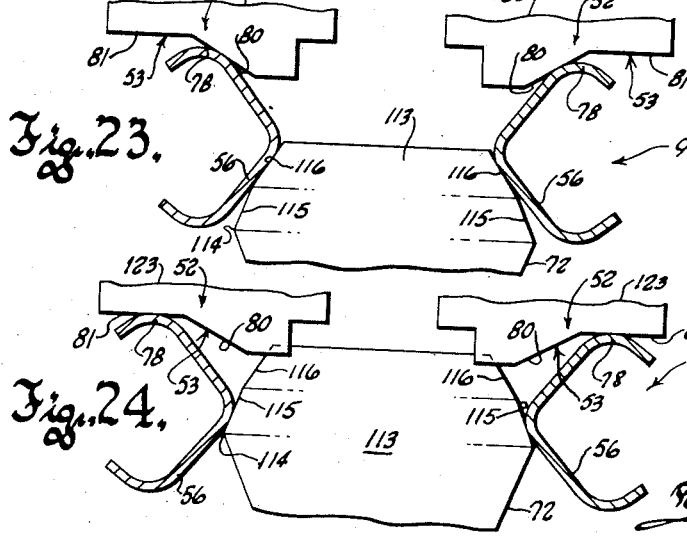
Inventors
Wayne A. Barden
Mervin B. Arisman

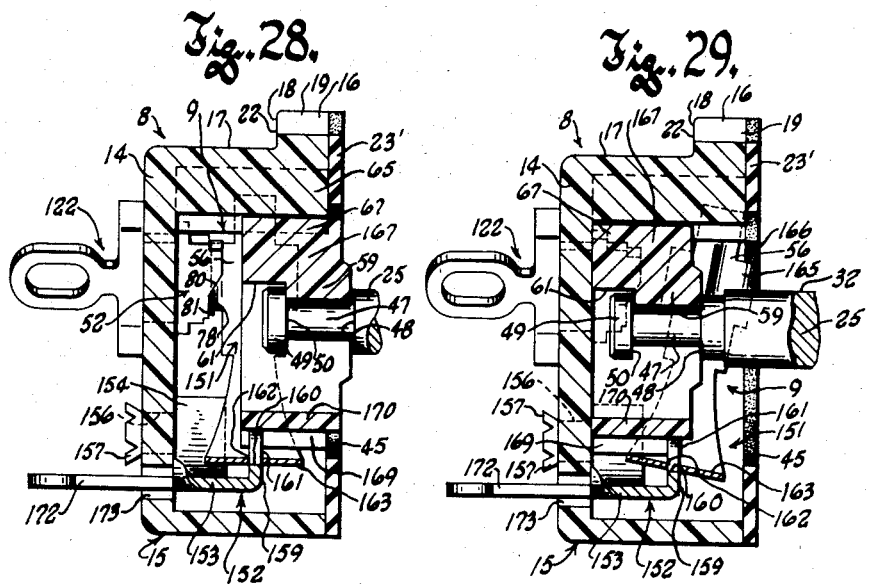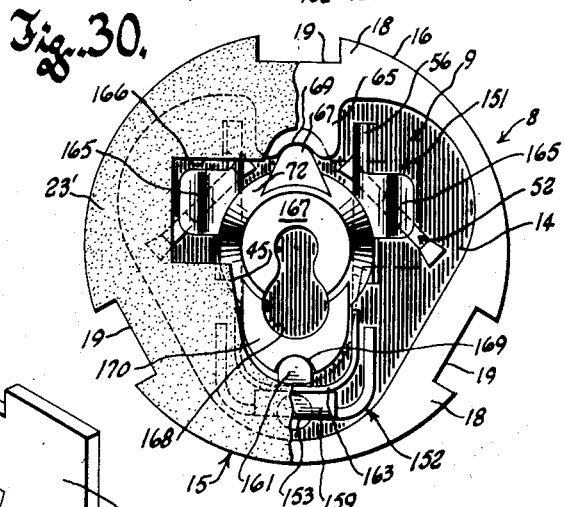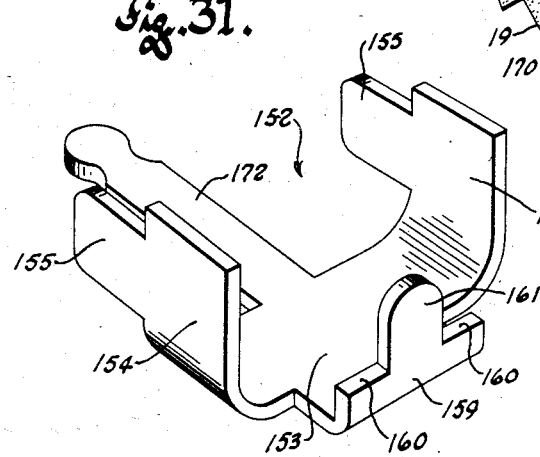

United States Patent Office 2,881,280
Patented Apr. 7, 1959

2,881,280

ELECTRIC SNAP SWITCH

Wayne A. Barden and Mervin B. Arisman, Elkhart, Ind., assignors to Chicago Telephone Supply Corporation, Elkhart, Ind., a corporation of Indiana Application February 14, 1958, Serial No. 715,286

21 Claims. (Cl. 200—77)

This invention relates to electric switches and refers more particularly to improvements in snap switches generally, and especially those of the type which are intended for association and joint operation with a variable resistor to provide a combination on-off switch and volume control for radio and television receivers.

In past combination controls of this type the switch component has been mounted on the back of the variable resistor and was actuated by a few degrees of rotation of the operating shaft of the resistor, at the low volume limit of adjustment of the resistor. Consequently the receiver could not be turned off without first adjusting the volume control to its lowest setting, and the volume had to be reset each time the switch was closed to turn on the receiver. This inconvenience was further aggravated by the fact that adjustment of the variable resistor to achieve the desired volume had to be delayed until after the expiration of the customary warm-up period of the receiver following closure of its on-off switch.

In general, therefore, it is one of the purposes of this invention to provide a combination variable resistor and electric snap switch wherein opening and closing of the switch can be effected without disturbing the adjustment of the variable resistor.

More specifically, it is a purpose of this invention to provide a combination variable resistor and electric switch wherein axial motion in one direction of a common rotatable operating shaft for the combination effects closure of the switch while opening of the switch is effected by axial motion of the operating shaft in the opposite direction.

A further purpose of this invention resides in the provision of an electric snap switch featuring the high degree of compactness so essential in controls for radio and television receivers, simplicity of construction, and a minimum of piece parts.

In a more specific sense it is an object of this invention to provide an electric snap switch featuring a simplified version of the well known overcenter principle of operation to make possible the reduction of the movable parts to only an actuator and a contactor. In this respect, it is another object of the invention to provide an electric snap switch of the character described wherein the actuator embodies overcentering means and the spring force necessary to effect snap actuation of the contactor between switch open and switch closed positions is supplied by the contactor itself.

Still another object of this invention resides in the provision of a snap switch of the character described having a U-shaped contactor which is floatingly supported within the housing for the switch, and has opposing spring arms which exert yielding balanced pressure upon opposite sides of the switch actuator to assure against binding of the latter during operation of the switch.

Another object of the invention resides in the provision of a snap switch of the character described wherein the contactor arms engage inclined surfaces on the actuator under spring force in the switch closed position of the contactor to be held thereby in unusually firm engagement with the stationary contacts of the switch.

A further object of the invention resides in the provision of a snap switch of the character described wherein movement of the switch actuator in a switch opening direction first effects spreading of the contactor arms and wiping engagement thereof along the stationary contacts with increasing pressure, toward surface areas of the contacts remote from those normally engaged by the contactor arms in the switch closed position, and thereafter effects separation of the contactor arms from the stationary contacts with a snap motion.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 1 is an enlarged longitudinal sectional view taken through a combined variable resistor and electric switch embodying this invention, the switch being shown in closed position;

Figure 2 is a sectional view taken along the line 2—2 in Figure 1 and showing only the switch component of the combination;

Figure 3 is a view similar to Figure 2 but showing the switch in open position;

Figure 4 is a cross sectional view taken through Figure 1 along the plane of the line 4—4;

Figure 5 is a fragmentary perspective view looking at the rear of the combination, a portion of the switch housing being broken away and shown in section;

Figure 6 is a fragmentary perspective view similar to Figure 5 but showing the rear of the variable resistor housing before securement of the switch thereto;

Figure 7 is a group perspective view of the component parts of the switch of this invention;

Figure 8 is a perspective view of the switch actuator per se;

Figure 9 is a longitudinal sectional view similar to Figure 1 but illustrating a modified embodiment of the invention;

Figure 10 is a sectional view through the switch component of the combination taken along the line 10—10 in Figure 9 and showing the switch in closed position;

Figure 11 is a sectional view similar to Figure 10 but showing the switch in open position;

Figure 12 is a cross sectional view taken through Figure 9 along the plane of the line 12—12;

Figure 13 is a perspective view looking at the back of the variable resistor housing, before securement of the switch of Figure 9 thereto;

Figure 14 is a group perspective view illustrating the components of the switch shown in Figure 9;

Figure 15 is a perspective view of the actuator per se for the switch of Figure 9;

Figure 16 is a view partly in side elevation and partly in longitudinal section illustrating another embodiment of the variable resistor-electric switch combination of this invention;

Figure 17 is a sectional view through the switch component of Figure 16, taken along the line 17—17 thereof, and showing the switch in closed position;

Figure 18 is a sectional view similar to Figure 17 but showing the switch in open position;

Figure 19 is a perspective view looking at the back of the variable resistor, before application of the switch of Figure 16 thereto, and showing the switch actuator in place upon the operating shaft of the variable resistor;

Figure 20 is a group perspective view showing the contactor and terminals for the switch of Figure 16 separated from the switch housing;

Figures 23 and 24 are diagrams illustrating the manner in which the contactor arms are caused to wipe along the stationary contacts during initial switch opening motion of the actuator;

Figure 26 is a rear perspective view of a typical switch of this invention having combined terminals and stationary contacts of another type secured to the rear of the switch housing;

Figure 27 is a view similar to Figure 26 but illustrating combined teminals and stationary contacts of still another type;

Figure 28 is a longitudinal sectional view through still another form of snap switch embodying this invention, showing the switch in closed position;

Figure 29 is a sectional view similar to Figure 28 but showing the switch in open position;

Figure 30 is a front elevational view of the switch shown in Figure 28, portions thereof being broken away to better illustrate details of construction; and Figure 31 is a perspective view of the combination terminal and contactor supporting member employed in the switch shown in Figures 28, 29 and 30.

Figure 21:
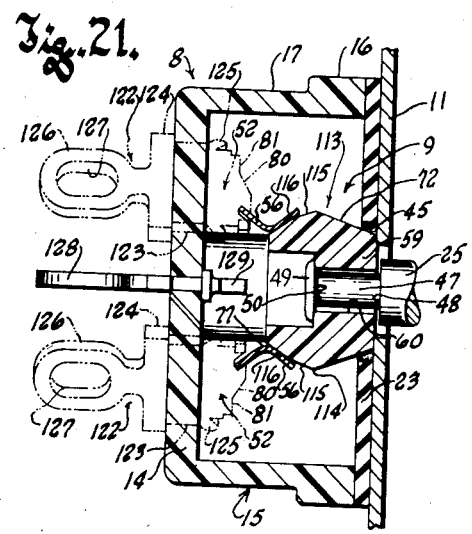
Figure 21 is a longitudinal sectional view through still another form of snap switch embodying this invention, showing the switch in closed position.

Referring now more particularly to the accompanying drawings, wherein like reference characters have been applied to like parts throughout the several views, the numeral 5 generally designates housing means for the variable resistor, electric switch combination of this invention. The housing means comprises a cup-like front housing section 6 containing a variable resistor 7, and a cup-like rear housing section 8, secured to the back of the front section and containing the electric snap switch 9 of this invention.

The cup-like front housing section is formed of metal and has a cylindrical side wall 10 extending forwardly from its bottom or rear wall 11. The bottom 11, of course, provides an intermediate wall of the housing means. A front wall 12 of insulating material, overlying and secured to the rim of the side wall 10, closes the front housing section and provides an insulating base upon the inner face of which the stator assembly 13 of the variable resistor is mounted.

The cup-like rear housing section 8 is preferably molded of insulating material, and its bottom 14 provides the rear wall of the housing means. The side wall 15 of the of the rear housing section has a cylindrical rim portion 16, and a reduced rear portion 17 which is more or less triangular in cross section so that the rim portion in effect provides three circumferentially spaced lugs 18 projecting outwardly from the rear housing section at its front. Each of these lugs has a notch 19 therein to enable the rear housing section to be secured to the back of the front housing section, as by tangs 20 struck from the back wall 11 of the variable resistor housing and passing rearwardly through the notches 19, with portions 21 on the rear extremities of the tangs deformed over the rearwardly facing surfaces 22 of the lugs. If desired, an insulating washer 23 may be interposed between the rim of the rear housing section and the back 11 of the front housing section.

In most respects the variable resistor follows conventional construction. It includes a ground plate 12' flatwise overlying and secured to the front wall 12 and which together with the front wall provides a support in which a bushing 24 is anchored with the threaded portion of the bushing projecting forwardly. The operating shaft 25 of the variable resistor is rotatably and slidably mounted in the bushing 24, and may carry a knob, not shown, on its outer end.

The stator assembly 13 of the resistor is fixed to the rear face of the front wall 12, and includes the customary annular resistance element 27 and a collector ring 28 encircled by the resistance element. The rotor assembly 30 includes an insulating driver 31 seated upon the operating shaft and having a splined driving connection therewith afforded by the reception of a noncircular shank portion 32 of the shaft in a correspondingly shaped noncircular hole in the hub 33 of the driver. The rotor assembly also includes a contactor assembly secured to the front face of the driver and including one or more spring contact fingers 35 engaged with the resistance element under spring pressure, and a spring finger 36 which rides upon the collector ring 28. At its rear, the driver has an annular runner 38 which bears directly against the inner face of the rear wall 11 of the resistor housing, and thereby so positions the driver as to maintain the correct spring tension in the fingers 35 and 36.

The noncircular portion 32 of the operating shaft, upon which the driver is carried, is reduced from the portion of the shaft forwardly thereof so as to define a rearwardly facing abutment 40 at its junction therewith. The abutment 40 is engageable with the front of the hub 33 on the driver to define the rearward limit of axial motion of the operating shaft. As will appear hereinafter the engagement of the abutment 40 on the shaft with the front of the hub 33 on the driver also defines the switch open position of the operating shaft seen in Fig. 3.

The rear end portion of the operating shaft projects through holes 44 and 45 in the rear wall 11 of the variable resistor housing and the insulating spacer 23, respectively, into the interior of the rear housing section. This rearwardly projecting end of the operating shaft has a circumferential groove therein to define a reduced neck 47, coaxial with the operating shaft, a rearwardly facing shoulder 48 at the forward extremity of the neck, and a head 49 on the rear extremity of the shaft. The underside of the head provides a forwardly facing shoulder 50 opposing the shoulder 48.

The snap switch of this invention includes a pair of stationary contacts 52 fixed to the rear wall 14 of the switch housing, at opposite sides of and spaced from a vertical plane containing the axis of the operating shaft 25. These stationary contacts have contact surfaces 53 thereon which face forwardly, away from the base provided by the end wall 14 of the rear housing section. The switch further includes a U-shaped movable bridging contactor 55, preferably of spring metal, having opposing upright resilient arms 56 which face one another across said plane and extend transversely of the base 14. These arms cooperate with the stationary contacts to electrically bridge the same in the switch closed position seen in Figures 1 and 2, and the contactor 55 is moved to and from its switch closed position at which the arms 56 thereof are in bridging engagement with the stationary contacts by means of an actuator 57, of insulating material, embraced by the arms 56 of the contactor.

The actuator 57 is mounted upon the neck portion 47 on the rear of the operating shaft 25 and is constrained to move axially fore and aft with the operating shaft while allowing the shaft to rotate relative to it. The actuator is generally in the shape of an annulus having a hub 59 on the forward end portion of the actuator loosely encircling the neck 47 on the rear of the operating shaft and axially confined between the opposing shoulders 48 and 50 thereon to drivingly connect the actuator with the shaft for axial motion therewith. The hole 60 in the actuator hub, in which the neck portion 47 of the shaft is received, opens to the bottom of a well 61 in the rear portion of the actuator, rearwardly of the hub and of a size to receive the head 49 on the rear extremity of the shaft. Both the central hole 60 and the well 61 are communicated with an eccentric hole 62 in the actuator through a slit 63 of a size to receive the neck 47 on the shaft, and the eccentric hole 62 is also large enough to accommodate the head 49 on the rear of the shaft.

Hence with the actuator in position within the switch housing, the connection of the operating shaft to the actuator merely involves endwise projection of the rear of the shaft through the eccentric hole 62 in the actuator followed by relative lateral motion between the shaft and actuator in the direction to carry the neck 47 on the shaft into the smaller hole 60 in the hub 59 of the actuator.

The actuator 57 may be guided for fore and aft movement with the operating shaft but prevented from rotation about the shaft axis. This may be accomplished by means of an interlocking sliding or spline-like connection between the actuator and the switch housing comprising a pair of diametrically opposite upper and lower bosses 65 and 66 on the housing, projecting inwardly toward and respectively engaged by lobes 67 and 68 on the exterior of the actuator. The bosses 65 and 66 extend along the entire axial dimension of the switch housing, and while the upper boss 65 is integrally joined with the side wall of the housing, the lower boss 66 is spaced slightly from the adjacent side wall portion of the housing and has its rear portion joined to the base or end wall 14 of the housing. Both bosses have longitudinal grooves or concavities 69 in their inner surfaces in which the rounded outer extremities of the lobes 67 and 68 on the actuator engage. Consequently, the actuator is effectively held against rotation about the axis of the operating shaft, but may be readily axially propelled forwardly and rearwardly by the shaft.

It will be noted that the lower lobe 68 on the actuator is made somewhat wider than the upper lobe 67; this being due to the fact that the eccentric hole 62 is located mainly in the lower lobe.

The exterior of the actuator is formed to have front and rear substantially frustoconical side surfaces 72 and 73, respectively. The small diameter portions of these surfaces are remote from one another and adjacent to the axial ends of the actuator, and their large diameter portions adjoin one another and define a circumferential crest 74 medially of the ends of the actuator.

The U-shaped bridging contactor 55 is guided for fore and aft motion in the switch housing partly by reason of the fact that its arms 56 embrace and yieldingly bear against the opposite sides of the actuator, and partly by the fact the bight portion of the contactor loosely embraces the lower lug 66 on the switch housing. This, of course, disposes the bight 75 of the contactor between the lower lug 66 on the housing and the adjacent side wall portion of the housing, as seen best in Figures 1 and 4.

Though the outer ends of the contactor arms at all times lie at opposite sides of the upper lug 65, they are held from contact therewith by the engagement of their medial portions with the opposite sides of the actuator 57.

The arms 56 of the U-shaped bridging contactor 55 are at all times biased toward one another and into pressure engagement with either the front tapered surfaces 72 on the actuator or its rear tapered surfaces 73, depending upon whether the switch is in open or closed position. Consequently, the actuator 57 may be said to be at all times wedgingly engaged between the arms 56 of the contactor.

At their areas of engagement with the actuator, each of the contactor arms 56 has a bearing pad 77 thereon which is substantially widely V-shaped in cross section, with the apex of the V facing inwardly toward one side of the actuator, and the diverging sides of the V sloped to substantially correspond to the tapers on the front and rear portions of the actuator.

When the operating shaft is in its forward or switch closed limit of motion shown in Figures 1 and 2 and defined by the engagement of the front of the actuator lobes 67 and 68 with the rear wall 11 of the resistor housing, the actuator is held thereby in the front portion of the switch housing, remote from the base 14 of the switch. In this position of the actuator, its crest 74 is located forwardly of the apexes of the V-shaped bearing pads 77 on the contactor arms, and its rear tapered surfaces 73 are engaged by the forward tapered sides on said bearing pads. As a result of the clamping force which the contactor arms exert on the inclined surfaces 73 on the rear portion of the actuator, the contactor more or less cams itself bodily rearwardly, down the inclined surfaces 73; and holds itself in a switch closed position at which outwardly curled extensions 78 on its arms are in firm engagement with the forwardly facing surfaces 53 of the stationary contacts 52.

When the operating shaft is moved axially rearwardly, in a switch opening direction, the actuator will first cause spreading or camming of the contactor arms apart, followed by sudden forward bodily motion of the contactor down the inclined forward surfaces 72 of the actuator as the crest 74 thereof passes the apexes of the V-shaped bearing pads 77 on the contactor arms, to thus effect snap actuation of the contactor to its switch open position seen in Figure 3.

It is a highly desirable feature of the switch of this invention that the crested, oppositely tapered actuator in cooperation with the U-shaped spring contactor, provides an unusually simple overcenter switch mechanism having only two moving parts. Equally important is the fact that the tapered rear of the actuator effects spreading of the contactor arms preliminary to snap actuation of the contactor to its switch open position. This spreading of the arms causes the outwardly curled extensions 78 on the contactor arms to wipe across the surfaces 53 of the stationary contacts to "break" positions that are remote from those portions of the stationary contacts which are engaged by the contactor in its normal switch closed position seen in Figure 2. The contact surfaces 53 of the stationary contacts, of course, are elongated substantially in the direction of spreading motion of the contactor arms, as seen best in Figures 2, 3 and 4.

To improve the action of the switch mechanism as well as to assure the best possible contact pressure between the contactor and both stationary contacts in the switch closed position of the contactor, it will be noted that those surfaces 80 on the stationary contacts 52 which are normally engaged by the outwardly curled extensions 78 on the contactor arms in the switch closed position of the contactor, are inclined away from the axis of the operating shaft toward the base 14 upon which the stationary contacts are mounted; while the surfaces 81 of the contacts which lie outwardly of these inclined surfaces 80 are substantially flat and parallel to the plane of the inner face of the switch base 14. In the switch closed position of the contactor 55, therefore, each of its arms is more or less tightly wedged under spring pressure between oppositely tapering surfaces on the stationary contacts and on the rear portion of the actuator so as to assure exceptionally good contact pressure between the contactor and the stationary contacts. Moreover, because the surfaces 80 on the stationary contacts are inclined, good seating of the contactor arms on each of the stationary contacts is assured despite inevitable manufacturing inaccuracies which could result in the actuator being off-center, which condition might cause it to hold one or the other of the contactor arms from proper engagement with its cooperating stationary contact. It will also be observed that those portions of the curled extensions 78 on the contactor arms which engage the inclined surfaces 80 on the stationary contacts in the switch closed position are spaced from those portions of the extensions 78 which engage the parallel surfaces 81 of the stationary contacts at the "break" positions of the contactor arms.

As soon as the operating shaft is moved to force the actuator axially rearwardly between the arms 56 of the contactor, the contactor arms are not only cammed apart against the spring force inherent therein, but they are also pushed rearwardly by the actuator as they ride outwardly and downwardly along the inclined surfaces 80 of the stationary contacts. This assures easy operation of the switch and at the same time maintains adequate contact pressure. Just prior to actual separation of the contactor arms from the stationary contacts, the outwardly curled extension 78 on the contactor arms will have been moved onto the flat surfaces 81 of the stationary contacts substantially without any loss of contact pressure. Good contact pressure, therefore, will obtain right up until the instant the crest 74 on the actuator passes rearwardly between the apexes of the V-shaped bearing pads on the contactor arms to effect snap actuation of the contactor to its switch open position seen in Figure 3.

As seen in Figures 1 and 2, the bight 75 of the U-shaped contactor engages a forwardly facing abutment 83 on the switch housing adjacent to the base 14 in the switch closed position of the contactor; while in its switch open position, both the bight and the outwardly curled extensions 78 on the contactor arms engage the inner face of the insulating spacer 23.

The bridging contactor 55 is also moved from switch open to switch closed positions with a snap action. This is accomplished by axial motion of the operating shaft, out of its position seen in Figure 3, to carry the inclined front end portion of the actuator forwardly between the bearing pads 77 on the contactor arms while the contactor is prevented from moving forwardly by its engagement with the insulating spacer 23. Although the contactor arms will again be yieldingly spread apart by the initial forward motion of the actuator, it will nevertheless be suddenly propelled rearwardly down the inclined rear surfaces 73 on the actuator as soon as its crest 74 passes forwardly beyond the apexes of the V-shaped bearing pads 77 on the contactor arms.

Attention is directed to the fact that the stationary contacts 52 are spaced far enough apart as to permit passage of the rear end portion of the actuator 57 therebetween during rearward travel of the actuator to its switch open position seen in Figure 3. As also seen in Figure 3, a shallow well 85 is provided in the inner face of the switch base 14 to receive and provide clearance for the rear end of the actuator in its switch open position.

It is also a feature of this invention that the stationary contacts 52 are formed integral with terminals 87 for the switch. Each of the two terminals comprises an elongated strip of metal having a body portion 88 which bears flatwise against the rear of the switch housing, and a stem portion 89 bent forwardly from its upper end and passing through a slit 90 in the base. The forward extremity of the stem 89 provides the stationary contact 52.

The combined contacts and terminals are held permanently fixed to the base 14 of the switch housing by swaging opposite side edge portions 91 of the stationary contacts outwardly against the inner face of the base. The body portions 88 of the terminals also have holes 92 therein to receive protrusions 93 on the rear of the base 14, for the purpose of reinforcing the connection of the terminals to the base and of providing increased stability thereof on the base. The outer end portions 94 of the terminals project beyond one edge of the base and may have prongs 95 formed thereon to facilitate connection of the switch to a printed circuit panel (not shown).

The variable resistor-electric switch combination shown in the embodiment of the invention illustrated in Figures 9 through 15 differs but slightly from that previously described. Whereas a keyhole opening was provided in the actuator for the switch of the previous embodiment of the invention, the actuator 96 shown in Figures 9 through 15 has its lower lobe bifurcated to provide opposite legs 97 which slidingly embrace a reduced upward extension 98 on the lower guide lug 99 to guide fore and aft motion of the actuator and to preclude rotation thereof about the axis of the operating shaft. The ends of the legs 97 also ride upon the opposite upwardly facing ledges 100 at the base of the extension 98 and thus cooperate with the lobe 67 at the top of the actuator to constrain the same to fore and aft motion in the switch housing.

The actuator and its separable connection to the rear of the operating shaft are in all other respects similar to that previously described. As long as the bifurcations 97 on the underside of the actuator are spaced apart a distance at least as great as the diameter of the head 49 on the rear of the operating shaft, the connection of the operating shaft to the actuator may be easily established upon rearward projection of the head 49 of the shaft between the bifurcations 97 while the actuator is in its foremost position in the switch housing, ahead of the upward extension 98 on the guide boss 99, followed by lateral movement of the shaft relative to the actuator to bring its neck portion 47 into the smaller hole 60 in the hub portion of the actuator.

In the snap switch construction shown in Figures 16 through 20, the actuator 102 is a true annulus having its hub 103 extended slightly in the forward direction, and provided with a hole 104 to freely receive a reduced cylindrical neck portion 105 on the rear end of the operating shaft 25. Relative axial motion between the shaft and the actuator is prevented by having the hub 103 of the actuator confined axially between shoulders 106 on the shaft engaging the forward end of the hub, and a cooperating shoulder 107 on the neck 105 peened over against the rear end of the hub, inside the well 61 in the rear of the actuator. Because of the absence of lobes on the actuator, the rear wall 11 of the resistor housing is provided with a smaller central hole 44 having forwardly extruded edge portions 72' engageable with the tapered front portion of the actuator to define the forward limit of motion of the operating shaft seen in Figure 17.

In this form of the invention also the operating shaft is at all times supported at its rear, as well as at its front portion. For this purpose, it has a reduced extension 108 projecting coaxially rearwardly from the neck 105 to provide a pilot which extends through the well 61 in the actuator and a short distance therebeyond to be at all times slidingly engaged in a pilot hole 109 formed in a central part of the base 14. In order to assure that the pilot 108 will at all times be engaged in its pilot hole 109, the pilot hole is formed in a central boss 109' on the base 14. This boss is of a size to be received in the well 61 in the actuator.

The stationary contacts 52, however, may have perfectly flat forwardly facing elongated contact surfaces 53 which are substantially parallel to the base 14. The forces exerted upon the contactor arms 56 by rearward motion of the cam-like actuator toward its switch open position, therefore, causes contact pressure between the outwardly curled extensions 78 on the contactor arms and the flat surfaces of the stationary contacts to increase substantially uniformly right up until the time the contactor is snapped forwardly to its switch open position.

Inasmuch as the actuator 102 is fixed directly to the rear of the operating shaft, it receives all of its guidance therefrom and only the lower housing carried guide lug 110 is necessary. The lower lug 110 is loosely embraced by the bight end portion of the contactor 55 and thus cooperates with the actuator itself to properly guide fore and aft motion of the contactor between its switch open and switch closed positions. In this connection it should be noted that the front of the guide lug 110 terminates short of the front of the switch housing, but that in compensation, the bight 75 of the contactor is slightly longer in its fore and aft dimension. The rear edge of the bight 75 of the contactor may also directly abut the base 14 of the switch housing in the switch closed position seen in Figures 16 and 17, while the forward edge of the bight engages directly with the rear wall 11 of the variable resistor housing in the switch open position of the contactor. The outer end portions of the contactor arms are also provided with more or less flat forwardly facing stops 111 thereon which bear directly against the rear wall 11 of the variable resistor housing in the switch open position of the contactor shown in Figure 18.

It will be observed that there is no insulating washer between the switch and resistor housing, such as was provided in the previous embodiments of the invention. Consequently, since the contactor 55 bears directly against the metal rear wall 11 of the variable resistor housing in its switch open position, the contactor will be grounded whenever it occupies its switch open position.

Figure 22:
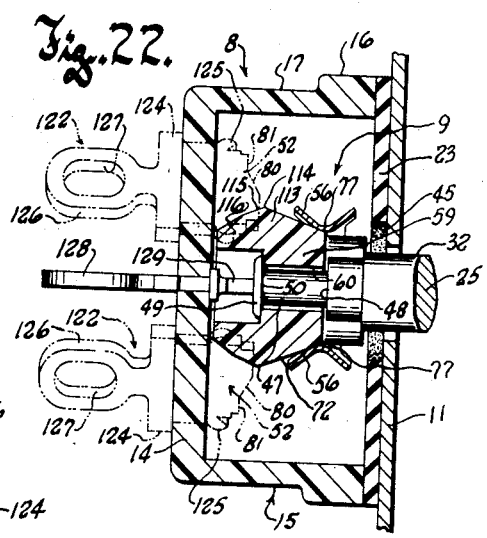
Figure 22 is a sectional view similar to Figure 21 but showing the switch in open position.

The snap switch illustrated in Figures 21 and 22 has the advantage of achieving maximum contact pressure without objectionably high operating pressure. This desirable result is brought about by the novel double sloped rear end portion on the actuator 113.

Extending rearwardly from the crest 114, the rear end portion of the actuator has a substantially shallow tapered section 115 comparable to that on the actuators previously described. The shallow tapered section 115, however, leads to a more steeply tapered section 116 adjacent to the rear extremity of the actuator.

In the switch closed position seen in Figures 21 and 23, the restoring force present in the U-shaped contactor causes its arms to wedgingly engage between the inclined surfaces 80 of the stationary contacts and the steeper tapered surfaces 116 on the rear of the actuator. Because of the steep inclination of the surfaces 116, more of the restoring force in the U-shaped contactor is translated into rearward force on the contactor than was the case in the previously described embodiments of the invention. As a result, the curled extensions 78 on the contactor arms are pressed more firmly against the stationary contacts.

Despite the steepness of the surfaces 116, the operating pressure during initial switch opening motion of the actuator is not objectionably high. This follows from the fact that the inclined surfaces 80, on the stationary contacts, against which the contactor arms bear at this time, have the effect of substantially nullifying the increased steepness of the actuator surfaces 116 by permitting the contactor to move bodily rearwardly as its arms are being spread apart by the actuator. Figure 23 illustrates the situation that obtains during this initial switch opening motion of the actuator.

When the contactor arms have been moved rearwardly and outwardly far enough by the actuator surfaces 116, their curled extensions 78 ride onto the flat "break" surfaces 81 of the stationary contacts. Since these "break" surfaces preclude further rearward displacement of the contactor, the additional switch opening motion of the actuator needed to carry its crest 114 past the contactor arms would require objectionably higher operating pressure were it not for the fact that such additional switch opening motion is effected while the surfaces 115 of lesser incline are in spreading engagement with the contactor arms as seen in Figure 24. As may be appreciated from a comparison of Figures 23 and 24, there is such cooperation between the surfaces 80 and 116, and between the surfaces 81 and 115 on the stationary contacts and the rear portion of the actuator, respectively, that operating pressures are held within the desired limits during both stages of switch opening motion of the actuator described.

Figure 25:
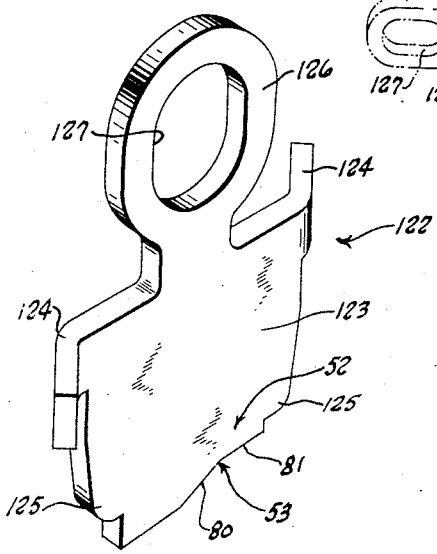
Figure 25 is an enlarged perspective view of one of the combined stationary contacts and terminals, per se, of the switch shown in Figures 21 and 22.

The switch shown in Figures 21 and 22 is also characterized by a combined stationary contact and terminal member 122 of somewhat different shape than previously described. As seen in Figure 25, it has a stem portion 123 which projects forwardly through a suitable slit in the base 14 of the switch housing to provide the stationary contact 52. Rearwardly of the base 14, however, the stem is provided with stabilizing lugs 124 extended from opposite side edges of the stem and bent to opposite sides of the plane of the stem. These lugs overlie and engage the rear surface of the base of the switch housing, and the combined terminal and contact member is permanently fixed to the base by swaging portions 125 of the opposite side edges of the forward extremity of the stem outwardly over the inner face of the base 14, as seen in Figures 21 and 22.

A rearward extension 126 on each of the combined terminal and contact members may be provided with an aperture 127 to facilitate connection of electrical leads thereto.

The switch shown in Figures 21 and 22 differs further from those previously described in that it is provided with a grounding terminal 128 fixed to the base in any desired manner but having a contact portion 129 exposed on the inner face of the base 14 in axial alignment with the head 49 on the operating shaft. In this case it can be assumed that the operating shaft is grounded to the housing of the variable resistor as by a flexible lead or a spring (not shown) fixed to the grounding plate and bearing against the shaft. Consequently, when the operating shaft is moved axially rearwardly to actuate the switch to its open position, the head 49 on the rear of the operating shaft engages the contact portion 129 on the grounding terminal 128 as seen in Figure 22.

In this case also, the actuator 113 may be in the form of a true annulus constrained to move axially with the operating shaft in the manner described in connection with Figure 1, but having no means to preclude rotation of the actuator relative to the shaft. Also, the front of the actuator hub bears directly against the rear wall 11 of the resistor housing to define the forward limit of motion of the operating shaft.

Figures 26 and 27 show two different forms of combined terminal and contact members which may be used to advantage with a switch of this invention.

Referring first to the terminal construction shown in Figure 26, it will be seen that each of the two terminals has a stem portion 130 projecting forwardly through a slit 131 in the base from the rear thereof, with the front of the stem providing the stationary contact 52. Rearwardly of the base 14 of the switch housing the stem is widened at its opposite side edges to provide shoulders 132 overlying and engaged with the rear face of the base 14. These shoulders cooperate with outwardly swaged portions 133 on the opposite side edges of the exposed front end portion of the stem to securely anchor the combined terminal and contact member to the base.

The terminal itself comprises an elongated strip, generally designated 135, bent out of the plane of the stem 130 and having an inner portion 136, of the same width as the stem portion 130, extending flatwise along the rear of the base 14, in spaced relation thereto, a forwardly offset intermediate portion 137 bearing flatwise against the rear of the base, and an outer end portion extending beyond one edge portion of the base, as at 138. The projecting outer end portion 138 is shaped to provide a shoulder 139 facing away from the base, and a pointed prong 140 of reduced width extending outwardly from said shoulder, to facilitate connection of the switch to a printed circuit panel.

An aperture 141 is provided in the intermediate portion 137 of the terminal to receive a protrusion 142 on the rear of the base. The engagement of this protrusion in the aperture 141 lends stability to the connection between the combined contact and terminal member and the base, and reinforces the terminal portion of the member against edgewise deflection.

The advantage of the terminal construction shown in Figure 26 is that the shoulders 132, which bear against the rear of the switch base and project beyond the adjacent side edges of the inner terminal portions 136, provide pads upon which the terminals may be supported during swaging of their stem portions 133 over the inner face of the switch base. Consequently, the swaging operation can be effected without resorting to support of the terminals solely upon the rounded corners at the junctions of their stem and body portions as is necessary with the terminals for the switches of Figures 1 through 20.

The combined terminal and contact members 143 shown in Figure 27 are designed to provide still better support for the terminals, on any flat surface, during swaging of the side edge portions 133 of their stems over the inner face of the switch base. This feature results from the fact that the inner portions 144 of the terminals are disposed edgewise with relation to the base 14 of the switch, rather than flatwise, and bear directly against the rear of the base. In addition, the inner portions 144 of the terminals are bent substantially to right angle shape, and the stem portions 130 are integrally joined to and project from the forward edges of the innermost legs 144' of the angles. These innermost legs may also project beyond the adjacent side edges of the stems 130 to provide shoulders 132 similar to those on the terminals of the Figure 26 switch.

At locations near the edge of the base, each terminal is also provided with a prong 145 which extends forwardly into a hole 146 in the switch base 14 to reinforce the terminal against flatwise flexure relative to the base.

The outer end portion 147 of the terminal member projects beyond the edge of the base and in this case is provided with an integral flange 148 bent from the forward edge of the terminal member to lie substantially parallel to the base. This flange is shaped to provide a shoulder 149 facing away from the base and a pointed prong 150 of reduced width extending outwardly beyond said shoulder to facilitate connection of the terminals to a printed circuit panel.

With the construction described, the rear edges of the terminals lie in a common plane parallel to the rear face of the switch base and may be engaged with any flat surface to provide exceptionally good support for the terminals during the swaging operation on the side edge portions 133 of their stems. In this respect, it should be noted that the angular shape of the inner portions 144 of the terminals assures stability during the swaging operation.

In all previous embodiments of the invention, the contactor of the switch has been bodily movable in fore and aft directions in the switch housing, between its switch open and switch closed positions. In the embodiment of the invention disclosed in Figures 28 through 31, however, the contactor 151, though again of U-shaped configuration, is carried by a supporting bracket 152 on the switch housing for fore and aft rocking motion about an axis which extends transversely across the switch housing.

The supporting bracket 152 is a sheet metal stamping, and as shown best in Figure 31 comprises a substantially U-shaped portion having a bight 153 and upstanding opposite legs 154. These legs and the bight portion 153 of the bracket lie inside the switch housing, and the rear edges of the legs bear against the inner face of the base 14. Tabs 155 extending from the rear edges of the legs 154 project through suitable apertures 156 in the switch base 14 and have their opposite side edge portions swaged over the rear of the base as at 157 to permanently secure the bracket to the base.

The bight 153 of the bracket is extended a slight distance forwardly and carries an upstanding flange 159 terminating in spaced coplanar fulcrum defining edges 160 and a tongue 161 flanked by the edges 160 and projecting upwardly therefrom. The tongue 161 passes upwardly through a hole 162 in the bight 163 of the U-shaped contactor 151, and the bight of the contactor seats upon the fulcrum defining edges 160 to support the contactor for fore and aft rocking motion, to and from bridging engagement with the stationary contacts 52 of the switch.

In the switch open position seen in Figure 30, the outwardly curled extensions 165 on the forward sides of the contactor arms pass through openings 166 in the insulating washer or separator 23' which is interposed between the switch and variable resistor housings to bear directly against the rear wall (not shown) of the variable resistor housing. Accordingly, the contactor 151 will be grounded in the switch open position thereof seen in Figure 30.

The actuator 167 in this case has upper and lower lobes and a keyhole shaped opening 168 therein similar to those provided in the actuator 57 of the Figure 1 switch, and its connection to the operating shaft 25, of course, is also the same. The actuator 167, however, is guided for back and forth motion in the switch housing and prevented from rotation about the axis of the operating shaft partly by means of the upper lobe and lug connection described previously, and partly by the engagement of the tongue 161 on the supporting bracket 152 in a longitudinal groove 169 in the lower lobe 170 on the actuator.

Consequently, the bracket 152 not only provides a pivotal support for the movable contactor 151, but it also contributes to the constraint of the actuator 151 to fore and aft motion in the switch housing. Also if desired, the bracket 152 may have a grounding terminal 172, formed integral therewith, and projecting from the rear edge of the bight 153 of the bracket through an opening 173 in the base 14, to be accessible at the rear thereof.

From the foregoing description taken together with the accompanying drawings, it will be readily apparent to those skilled in the art that this invention provides a unique snap switch featuring a simplified overcenter snap mechanism having a minimum of parts, and which snap mechanism assures unusually good contact pressure and a highly desirable wiping action of the contactor across the stationary contacts preliminary to separation thereof from the stationary contacts.

What is claimed as our invention is:

1. An electric snap switch comprising: a housing having a rear wall providing a base; a pair of stationary contacts mounted on the front of the base and having forwardly facing contact surfaces, said stationary contacts lying at opposite sides of a plane which is normal to the base; a U-shaped bridging contactor having opposing resilient arms which are movable toward and from one another and extend transversely of the base; means on the housing supporting the contactor for fore and aft movement between a switch open position at which its arms are spaced from the stationary contacts and a switch closed position at which its arms are in bridging engagement with the stationary contacts, and with its arms disposed at opposite sides of said plane; a movable actuator; means connected with the housing guiding the actuator for fore and aft movement with the actuator disposed between the arms of the U-shaped bridging contactor; and cooperating means on the contactor and the actuator for translating motion of the actuator in either direction into snap actuation of the contactor in the opposite direction to one of said positions thereof, said cooperating means including a crested part on the actuator wedgingly engaged between the contactor arms and taperingly reduced in both fore and aft directions, from the crest of said part.

2. An electric snap switch of the type having an actuator movable back and forth along a predetermined path parallel to the axis of the switch to effect opening and closing of the switch, characterized by: the provision of a contactor movable in opposite directions substantially parallel to said path between a switch open position and a switch closed position at which it is adapted to bridge a pair of stationary contacts; by the fact that the contactor comprises a pair of spring blades and is so disposed that the blades thereof are intersected by a plane transverse to the axis of the switch, said blades having contact engaging means thereon and being yieldingly biased in directions substantially normal to said path into pressure engagement with the actuator; and by the provision of cooperating overcentering means on the actuator and the contactor blades held in pressure engagement with one another under the spring force of the contactor blades, for translating motion of the actuator in either direction into snap actuation of the contactor in the opposite direction to one of said positions thereof.

3. An electric snap switch comprising: a housing having a rear wall providing a base; a pair of stationary contacts mounted on the front of the base and having forwardly facing contact surfaces; a movable actuator; means connected with the housing guiding the actuator for movement in opposite directions along a path substantially normal to said base; a movable bridging contactor having flexible spring blades disposed crosswise of said path at opposite sides thereof and cooperable with said stationary contacts; means on the housing supporting the contactor for movement in opposite directions substantially parallel to said path, between a switch open position at which its blades are spaced from the stationary contacts and a switch closed position at which its blades are in bridging engagement with the stationary contacts; and cooperating means on the contactor blades and the actuator having interengaging surfaces held in pressure engagement with one another by the spring force of said blades, for translating motion of the actuator in either direction into snap actuation of the contactor in the opposite direction to one of said positions thereof.

4. An electric snap switch comprising: a housing having a rear wall providing a base; a pair of stationary contacts mounted on the front of the base at opposite sides of a plane normal to the base, and having forwardly facing contact surfaces which are elongated in directions away from said plane; a U-shaped bridging contactor having opposing spring arms which extend transversely of the base and are flexible toward and from one another; means connected with the housing to support the contactor for fore and aft movement toward and from a switch closed position at which its arms are in bridging engagement with the stationary contacts; a movable actuator at all times wedgingly engaged between the contactor arms so that the latter bear upon opposite sides of the actuator under spring force; means connected with the housing guiding the actuator for fore and aft movement between switch open and switch closed positions along a path parallel to said plane; and fore and aft tapered portions on said sides of the actuator diverging away from said path toward a medial crest, said arms forcefully embracing one of said tapered portions in either position of the actuator so that motion of the actuator in either direction between said positions thereof effects successive engagement between the contactor arms and each of said tapered portions and sudden propulsion of the contactor in the opposite direction under the action of said arms upon the other tapered portion, initial motion of the actuator in the switch opening direction causing both rearward and outward spreading forces to be simultaneously imposed upon the contactor arms and wiping thereof along said elongated surfaces of the stationary contacts substantially without loss of contact pressure before separation of the contactor arms from the stationary contacts takes place.

5. The electric switch of claim 4 further characterized by the fact that the contactor arms normally engage surfaces on the stationary contacts which are inclined forwardly away from the base, toward said plane, so that the restoring force of the spring arms tends to wedge the same between the rear tapered portion of the actuator and the oppositely inclined surfaces of the stationary contacts and thereby assures good contact pressure in the switch closed position of the contactor.

6. The electric switch of claim 5, wherein the stationary contacts have substantially flat surfaces thereon outwardly of said inclined surfaces, and onto which the contact arms are forced by the rear tapered portion of the actuator during spreading of the arms by the rear tapered portion of the actuator.

7. The electric switch of claim 6, further characterized by the fact that said rear tapered portion of the actuator has a non-uniform slope with the steepest slope remote from said crest.

8. The electric switch of claim 4, wherein said elongated contact surfaces on the stationary contacts are flat and lie in a common plane substantially normal to the path of travel of the actuator.

9. The electric snap switch of claim 4, wherein the contactor arms have outwardly curled, rearwardly convex contact engaging portions; wherein the stationary contacts have inner portions adjacent to said plane which have surfaces that are inclined forwardly toward said plane and are normally engaged by cooperating inwardly facing surfaces on said contact engaging portions in the switch closed position of the contactor, and have outer portions with surfaces normal to said plane and normally spaced from cooperating rearwardly facing surfaces on the contact engaging portions of the arms but engageable by said rearwardly facing surfaces upon switch opening motion of the actuator; and further characterized by the fact that the rearmost portion of the actuator has a substantially steeper taper than the portion of the actuator immediately to the rear of its medial crest and is normally forcefully embraced by the contactor arms in the switch closed position.

10. In an electric snap switch including housing means and an operating shaft carried by the housing means for endwise fore and aft movement between switch open and switch closed positions; a pair of stationary contacts mounted at opposite sides of a plane containing the axis of the operating shaft and adjacent to the rear of the shaft, said contacts having forwardly facing contact surfaces; an actuator on the rear of the shaft; a substantially U-shaped bridging contactor mounted for fore and aft movement between defined positions, and having spring arms which bridgingly engage the stationary contacts at one of said positions, said arms extending crosswise of the shaft axis and yieldingly embracing the actuator; and overcenter cam means on the actuator wedgingly engaged between the contactor arms and rendered operative by the spring force thereof during shaft produced motion of the actuator in either direction to effect snap actuation of the contactor in the opposite direction to one of said positions thereof.

11. The electric snap switch of claim 10 further characterized by the provision of pivot defining means carried by the housing means and mounting the contactor for fore and aft rocking motion about a transverse axis adjacent to its bight and remote from the axis of the operating shaft.

12. The electric snap switch of claim 11 wherein said pivot defining means comprises a sheet metal stamping fixed to the housing means and having a part projecting forwardly adjacent to the outer side of the bight of the contactor, and a flange on the front of said part bent inwardly toward and engaging the outer side of the bight of the contactor to provide a fulcrum upon which the contactor is pivotally supported; and further characterized by the provision of a contactor retaining tongue on said flange loosely passing through an opening in the bight of the contactor and slidingly engaged in a groove in the exterior of the actuator to constrain the actuator to fore and aft motion in the compartment.

13. The electric snap switch of claim 12 further characterized by the provision of a rearward extension on said sheet metal stamping projecting through and beyond the rear wall of the switch compartment to provide a terminal accessible from the rear of the housing means.

14. The electric snap switch of claim 10 wherein the operating shaft is of metal and the actuator has a hole therein through which the rear of the operating shaft loosely projects; further characterized by the fact that the actuator is of insulating material and is restrained against axial motion relative to the shaft by means which includes an enlarged head on the rear extremity of the shaft; and further characterized by the provision of a terminal on the rear of the housing means having a contact portion in line with the shaft axis to be engaged by said enlarged head on the shaft to define the switch open position of the shaft.

15. The electric snap switch of claim 10 further characterized by the provision of cooperating slidingly engaged pilot means on the rear of the housing means and on the rear of the operating shaft, at all times supporting the rear of the operating shaft.

16. The electric snap switch of claim 10 further characterized by the provision of contactor guide means carried by the housing means and engaged with portions of the contactor remote from the actuator to substantially constrain the contactor to translatory fore and aft motion between its switch open and switch closed positions without interfering with lateral flexure of the spring arms thereof.

17. The electric snap switch of claim 10 wherein the actuator is an annulus loosely seated on a reduced rear end portion of the operating shaft so as to be confined against axial motion relative to the shaft, said actuator having an eccentric hole therethrough large enough to accommodate the rear of the shaft and communicating with the central hole in the annulus through a slot having a width to slidingly receive the reduced rear end portion of the shaft; and further characterized by the provision of means fixed with respect to the walls of the switch compartment having guiding engagement with the actuator and precluding shifting thereof in the direction to bring its eccentric hole into alignment with the shaft axis.

18. An electric snap switch comprising: a housing providing a switch compartment having a side wall and spaced front and rear walls; an operating shaft carried by the housing means for endwise fore and aft sliding movement between switch open and switch closed positions and for rotation on its axis, and having its rear in the interior of said compartment; a pair of stationary contacts on the inner face of said rear wall, at opposite sides of a plane containing the axis of the operating shaft, said contacts having forwardly facing contact surfaces; a movable actuator in said compartment; means providing a motion transmitting connection between the actuator and the rear of the shaft allowing relative rotation between the shaft and the actuator but constraining the actuator to move axially in opposite directions with the shaft; actuator guide means comprising bosses on the housing projecting toward the actuator from opposite sides thereof and intersected by said plane; lobe means on the actuator engaged with said guide bosses to preclude rotation of the actuator about the axis of the operating shaft without interfering with fore and aft motion of the actuator in the compartment; a substantially U-shaped bridging contactor in said compartment movable fore and aft between switch open and switch closed positions, said contactor having opposite spring arms engaging the actuator under spring pressure and extending transversely across the switch compartment, said arms being engageable with the stationary contacts in the switch closed position of the contactor; and cooperating overcentering means on the actuator and the contactor arms rendered operative by the pressure of the arms on the actuator during shaft produced motion of the actuator in either direction to effect snap actuation of the contactor in the opposite direction to one of said positions thereof.

19. The electric snap switch of claim 18 wherein one of said actuator guide bosses is fixed to the rear wall of the switch compartment and projects forwardly therefrom between the inner end portions of the spring arms on the contactor, and the bight of the contactor is loosely confined between said boss and the adjacent portion of the side wall of the compartment to be guided thereby for fore and aft motion in the compartment.

20. The electric snap switch of claim 18 wherein the rear of the operating shaft projects through a hole in the actuator and has oppositely facing shoulders thereon engaging portions of the actuator to constrain the same to axial movement with the shaft; and further characterized by the fact that the lobe means on the actuator comprises a bifurcated lobe slidingly straddling one of said actuator guide bosses.

21. The electric snap switch of claim 20 wherein the actuator has a lobe projecting therefrom and constituting said bifurcated portion, the slot between said bifurcations opening to the outer extremity of the lobe and to the hole in the actuator and being of a size to loosely receive the rear of the operating shaft to facilitate assembly of the actuator to the shaft.

References Cited in the file of this patent

UNITED STATES PATENTS

| | | |
|---|---|---|
| 2,612,577 | Jacobi | Sept. 30, 1952 |
| 2,671,140 | Schellman | Mar. 2, 1954 |
| 2,671,841 | Vaksvik | Mar. 9, 1954 |
| 2,762,880 | Hathorn | Sept. 11, 1956 |
| 2,777,911 | Cox | Jan. 15, 1957 |
| 2,844,676 | Barden et al. | July 22, 1958 |

FOREIGN PATENTS

| | | |
|---|---|---|
| 427,865 | Germany | Apr. 21, 1926 |
| 814,209 | France | Mar. 15, 1937 |